United States Patent
Chang et al.

(10) Patent No.: US 7,463,009 B2
(45) Date of Patent: Dec. 9, 2008

(54) HYBRID BATTERY MODULE WITH A VOLTAGE BALANCING UNIT AND ITS CHARGING AND DISCHARGING METHOD

(75) Inventors: Chen Chia Chang, Taipei (TW); Chuang Chih Tarng, Taipei (TW)

(73) Assignee: Compal Electronics, Inc., Neihu, Taipei (TW)

( * ) Notice: Subject to any disclaimer, the term of this patent is extended or adjusted under 35 U.S.C. 154(b) by 304 days.

(21) Appl. No.: 11/541,901

(22) Filed: Oct. 2, 2006

(65) Prior Publication Data

US 2008/0012529 A1 Jan. 17, 2008

(30) Foreign Application Priority Data

Jul. 17, 2006 (TW) .............................. 95126058 A

(51) Int. Cl.
*H02J 7/00* (2006.01)
(52) U.S. Cl. .................. 320/121; 320/118; 320/119; 320/134
(58) Field of Classification Search ......... 320/117–121, 320/134
See application file for complete search history.

(56) References Cited

U.S. PATENT DOCUMENTS 5,557,188 A * 9/1996 Piercey .................. 320/134
6,051,955 A * 4/2000 Saeki et al. ............ 320/121

* cited by examiner

*Primary Examiner*—Adolf Berhane
*Assistant Examiner*—Samuel Berhanu
(74) *Attorney, Agent, or Firm*—Ming Chow Sinorica, LLC

(57) ABSTRACT

The present invention relates to a hybrid battery module with voltage balancing unit, which comprises: a first cell set; a first programmable fuse; a first discharging switch; a first charging switch; a first analog front end circuit; a first thermister; a second cell set; a second programmable fuse; a second discharging switch; a second charging switch; a second analog front end circuit; a second thermister; a controller; and a voltage balancing unit; whereby the voltage of the first cell set and the second cell set can reach a balance state by the voltage balancing unit; and during the charging process, the first charging switch and the second charging switch will simultaneously be turned off when it meets a safety event; and during the discharging process, the first programmable fuse and the second programmable fuse will simultaneously be burned off when it meets a critical safety event so as to prevent cell from being burned; Furthermore, the present invention also provides a method for charging and discharging a hybrid battery module with a voltage balancing unit.

20 Claims, 4 Drawing Sheets

Figure 1:
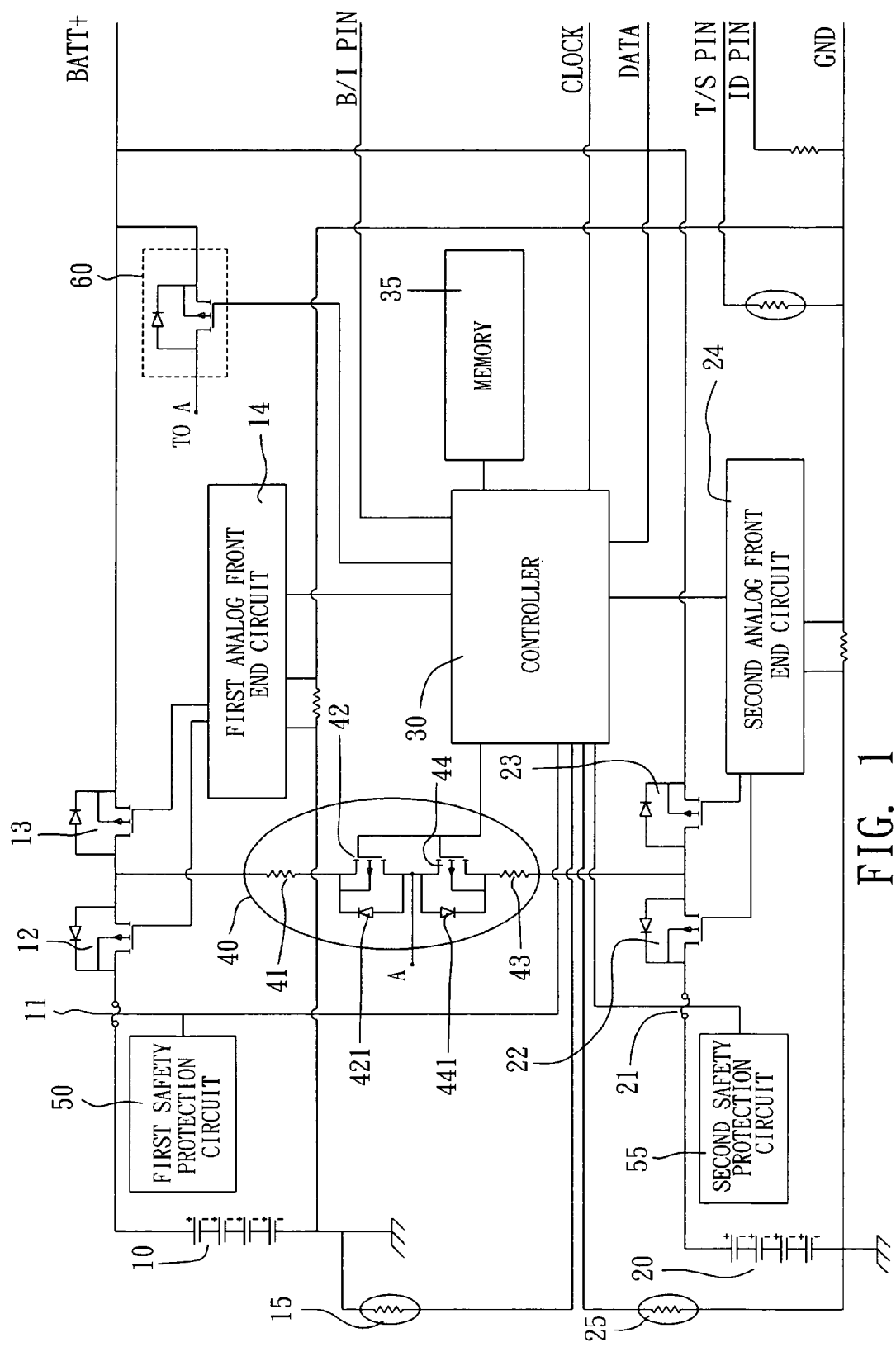

HYBRID BATTERY MODULE WITH A VOLTAGE BALANCING UNIT AND ITS CHARGING AND DISCHARGING METHOD

BACKGROUND OF THE INVENTION

1. Field of the Invention

The present invention relates to a hybrid battery module with a voltage balancing unit and its charging and discharging method; and more particularly to a hybrid battery module can be discharged by a voltage balancing unit so as to reach the goal of voltage balance, and no matter the hybrid battery module is in a charging mode or a discharging mode, once a cell set meets an abnormal or a critical safety event, the charging switch, the discharging switch and fuse of the two cell sets will simultaneously be turned off, so as to prevent the cell sets from being damaged.

2. Description of the Related Art

Regarding the conventional battery module and its charging and discharging method, such as a battery module with a plurality of cell sets disclosed in US patent Publication No. 20050116688 (US published patent application). The battery module is mainly used to prevent a single (or specific) cell from being decayed, and each cell set therein comprises one or more cells. Such hybrid battery module with voltage balancing unit uses the central processing unit (CPU) inside the electronic apparatus to determine which cell should be in the active state based on the number of the charging/discharging cycles of the cell. Therefore, each cell set is charged/discharged in a sequenced manner. However, once one of the cells encounters a problem during the charging/discharging operation, the forgoing patent is not able to turn off the battery charging switches simultaneously, which easily damages the battery module. Additionally, the cell sets of the forgoing patent are charged and discharged in series, thus its disadvantages are lower load capacity and longer charging/discharging time.

SUMMARY OF THE INVENTION

Therefore, it is a primary objective of the present invention to provide a hybrid battery module with a voltage balancing unit and its charging and discharging method, in which more than two cell sets are used, and different types of cell sets can be selected for adapting to various sizes of the electronic apparatus, such that more design flexibility is provided.

Another objective of the present invention is to provide a hybrid battery module with a voltage balancing unit and its charging and discharging method, in which the charging/discharging operations are performed through the control of the charging/discharging controlling method in parallel, so as to provide a higher load capacity and a shorter charging time.

It is yet another objective of the present invention to provide a hybrid battery module with a voltage balancing unit and its charging and discharging method, in which the charging/discharging operations are performed through the control of the charging/discharging controlling method in parallel, such that the voltages (potentials) of different types of cell sets can reach a balanced state, so as to substantially employ the stored energy.

It is yet another objective of the present invention to provide a hybrid battery module with a voltage balancing unit and its charging and discharging method, in which the hybrid battery module comprises a voltage balancing unit, and the first cell set and the second cell set can reach the goal of voltage balance by way of using the voltage balancing unit, and during the charging process, the first charging switch and the second charging switch will simultaneously be turned off when it meets a safety event.

To achieve the foregoing objectives, the hybrid battery module with a voltage balancing unit provided by the present invention comprises: a first cell set; a first programmable fuse having a first end coupled to the first cell set; a first discharging switch having a source coupled to a second end of the first programmable fuse; a first charging switch having a drain coupled to a drain of the first discharging switch; a first analog front end circuit coupled to the gates of the first discharging switch and the first charging switch respectively for detecting the voltage or the current of the first cell set in order to control the ON and OFF of the first discharging switch and the first charging switch; a first thermister having an end coupled to a ground for detecting the temperature of the first cell set; a second cell set; a second programmable fuse having a first end coupled to the second cell set; a second discharging switch having a source coupled to a second end of the second programmable fuse; a second charging switch having a drain coupled to a drain of the second discharging switch; a second analog front end circuit coupled to the gates of the second discharging switch and the second charging switch respectively for detecting the voltage or the current of the second cell set in order to control the ON and OFF of the second discharging switch and the second charging switch; a second thermister having an end coupled to a ground for detecting the temperature of the second cell set; a controller coupled to another end of the first thermister, a control terminal of the first programmable fuse, another end of the second thermister and a control terminal of the second programmable fuse, respectively; and a voltage balancing unit coupled to the controller, the first charging switch, the first discharging switch, the second charging switch and the second discharging switch, respectively; whereby the first cell set and the second cell set can be discharged by the voltage balancing unit, so as to reach the goal of voltage balance.

To achieve the foregoing objectives, a method for charging a hybrid battery module with a voltage balancing unit, wherein the battery module comprises a first cell set and a second cell set, a first charging switch and a second charging switch, and a first fuse and a second fuse, and the charging method comprises: switching the first cell set and the second cell set into a charging state; respectively turning on the first charging switch and the second charging switch and charging the first cell set and the second cell set; determining whether a voltage in the first cell set or the second cell set is too high, and if it is, turning off the first charging switch and the second charging switch simultaneously; determining whether a charging current in the first cell set or the second cell set is too high, and if it is, turning off the first charging switch and the second charging switch simultaneously; determining whether a charging temperature in the first cell set or the second cell set is too high, and if it is, turning off the first charging switch and the second charging switch simultaneously; determining whether the voltage in said first cell set or the second cell set is balanced or not; and if it is not balanced, burning out the first fuse and the second fuse simultaneously; determining whether the first charging switch or the second charging switch fails to function, and if it does, burning out the first fuse and the second fuse simultaneously; determining whether the voltage in the first cell set or the second cell set exceeds a threshold voltage, and if it does, burning out the first fuse and the second fuse simultaneously; determining whether the first cell set and the second cell set are fully charged, and if they are not fully charged, continuously charging the first cell set and the second cell set; and respectively turning off the first charging switch and the second charging switch.

To achieve the foregoing objectives, a method for discharging a hybrid battery module with a voltage balancing unit of the present invention is provided, wherein the battery module comprises a first cell set and a second cell set, a first discharging switch and a second discharging switch, and a first fuse and a second fuse, and the discharging method comprises the following steps: switching the first cell set and the second cell set into a discharging state; respectively turning on the first discharging switch and the second discharging switch and discharging the first cell set and the second cell set; determining whether the voltage in the first cell set or the second cell set is too low, and if it is, turning off the first discharging switch and the second discharging switch simultaneously; determining whether the discharging current in the first cell set or the second cell set is too high, and if it is, turning off the first discharging switch and the second discharging switch simultaneously; determining the discharging temperature in the first cell set or the second cell set is too high, and if it is, turning off the first discharging switch and the second discharging switch simultaneously; and determining whether the first discharging switch or the second discharging switch fails to function, and if it does, burning out the first fuse and the second fuse simultaneously.

To achieve the foregoing objectives, a method for balancing the voltage of a hybrid battery module of the present invention is provided, wherein the battery module comprises a first cell set and a second cell set, a first charging switch and a second charging switch, and a first discharging switch and a second discharging switch, and the discharging method comprises the following steps: (1) the first and second discharging switches being turned on and the first and second charging switches being turned off when the cell sets are assembled completely; (2) determining whether the voltage of one of the cell in the first cell set is too high, if it is, turning off the second field effect transistor; (3) determining whether the voltage of one of the cell in the second cell set is too high, if it is, turning off the first field effect transistor; (4) determining whether the discharging current of the first cell set or the second cell set is too high, if it is, turning off the first discharging switch and the second discharging switch simultaneously; and (5) determining whether the difference of the voltage between the first cell set and the second cell set exceeds a specific voltage, if it does, backing to the STEP (2) to continue discharging; otherwise, turning on the first and the second charging switches.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

FIG. 1 is a schematic block diagram showing a hybrid battery module with a voltage balancing unit according to a preferred embodiment of the present invention.

Figure 2:
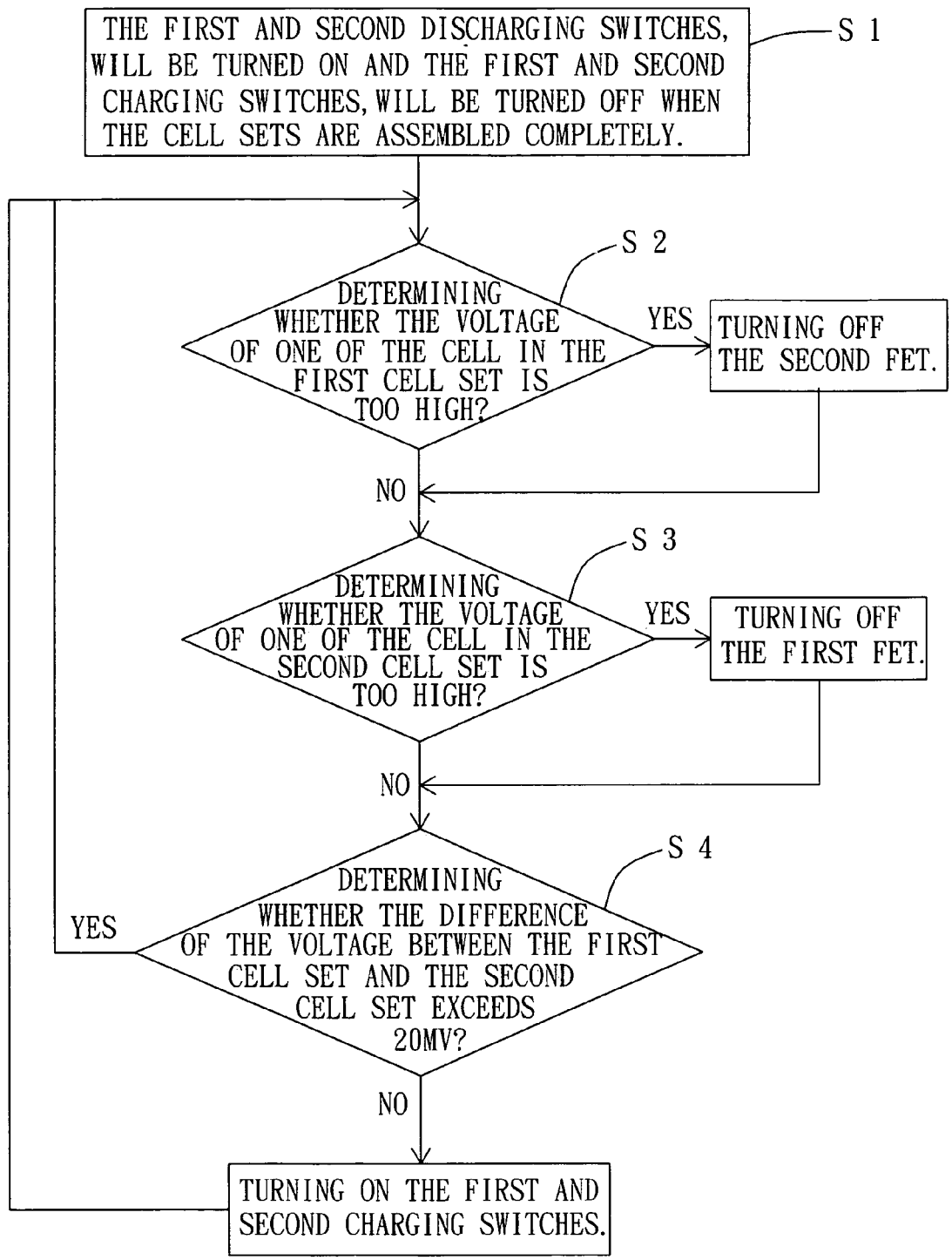

FIG. 2 schematically shows a flow chart illustrating a method for balancing the voltage of a hybrid battery module according to a preferred embodiment of the present invention.

Figure 3:
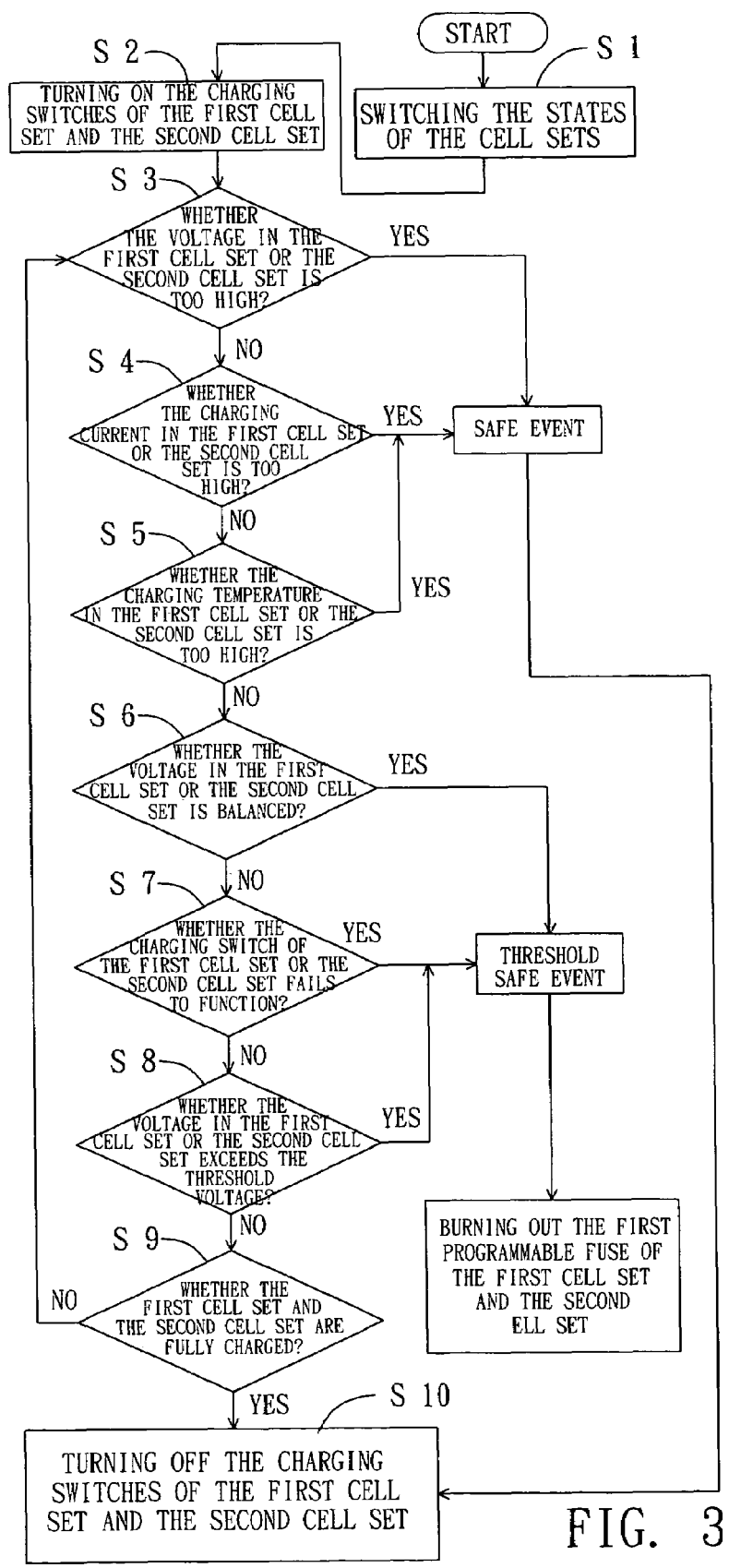

FIG. 3 schematically shows a flow chart illustrating a method for charging the hybrid battery module with a voltage balancing unit according to a preferred embodiment of the present invention.

Figure 4:
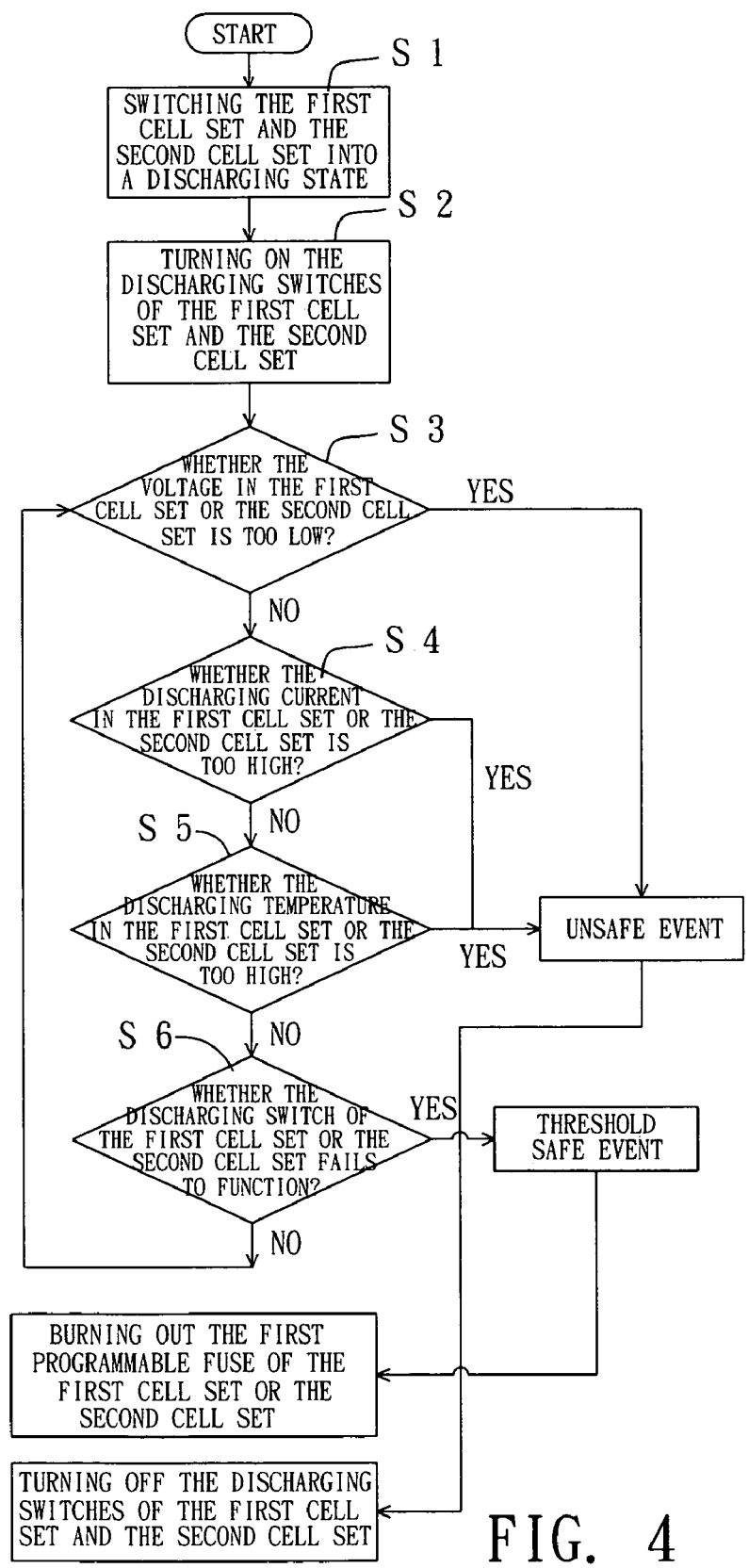

FIG. 4 schematically shows a flow chart illustrating a method for discharging a hybrid battery module with a voltage balancing unit according to a preferred embodiment of the present invention.

DESCRIPTION PREFERRED EMBODIMENTS

FIG. 1 is a schematic block diagram showing a hybrid battery module with a voltage balancing unit according to a preferred embodiment of the present invention. The hybrid battery module with a voltage balancing unit of the present invention at least comprises: a first cell set 10; a first programmable fuse 11; a first discharging switch 12; a first charging switch 13; a first analog front end circuit 14; a first thermister 15; a second cell set 20; a second programmable fuse 21; a second discharging switch 22; a second charging switch 23; a second analog front end circuit 24; a second thermister 25; a controller 30; and a voltage balancing unit 40.

Wherein, the first cell set 10 is a chargeable battery pack that comprises a plurality of cells.

The first programmable fuse 11 has three terminals, wherein a first end is coupled to the first cell set 10, a second end is coupled to a source of the first discharging switch 12, and a control terminal is coupled to the controller 30. The controller 30 controls the current to flow between the first end—Control terminal and the second end—control terminal by applying a low voltage to the control terminal, such that the temperature on the resistor (not shown in the figure) is increased to burn out the first programmable fuse 11.

The first discharging switch 12 includes but not limited to a field effect transistor (FET), and the source of the first discharging switch 12 is coupled to the second end of the first programmable fuse 11.

The first charging switch 13 includes but not limited to a field effect transistor (FET), and a drain of the first charging switch 13 is coupled to a drain of the first discharging switch 12.

The first analog front end circuit 14 is an integrated circuit (IC), which coupled to the gates of the first discharging switch 12 and the first charging switch 13 respectively, and a built-in detector (not shown in the figure) detects the voltage or the current of the first cell set 10 in order to control the ON and OFF of the first discharging switch 12 and the first charging switch 13.

One end of the first thermister 15 is coupled to a ground, and another end of the first thermister 15 is coupled to the controller 30 for detecting the temperature of the first cell set 10 and transmitting the detected temperature to the controller 30 for further process.

The second cell set 20 is also a chargeable battery pack that comprises a plurality of cells.

The second programmable fuse 21 has three terminals, wherein a first end is coupled to the second cell set 20, a second end is coupled to a source of the second discharging switch 22, and a control terminal is coupled to the controller 30. The controller 30 controls the current to flow between the first end—control terminal and the second end—control terminal by applying a low voltage to the control terminal, such that the temperature on the resistor (not shown in the figure) is increased to burn out the second programmable fuse 21.

The second discharging switch 22 includes but not limited to a field effect transistor (FET), and the source of the second discharging switch 22 is coupled to the second end of the second programmable fuse 21.

The second charging switch 23 includes but not limited to a field effect transistor (FET), and a drain of the second charging switch 23 is coupled to a drain of the second discharging switch 22.

The second analog front end circuit 24 is an integrated circuit (IC), which coupled to the gates of the second discharging switch 22 and the second charging switch 23 respectively, and a built-in detector (not shown in the figure) detects the voltage or the current of the second cell set 20 in order to control the ON and OFF of the second discharging switch 22 and the second charging switch 23.

One end of the second thermister 25 is coupled to a ground, and another end of the second thermister 25 is coupled to the controller 30 for detecting the temperature of the second cell set 20 and transmitting the detected temperature to the controller 30 for further process.

The controller 30 is respectively coupled to another end of the first thermister 15, a control terminal of the first programmable fuse 11, another end of the second thermister 25, and a control terminal of the second programmable fuse 21 for receiving the parameters such as the voltage, current and temperature on the first cell set 10 that are detected by the first analog front end circuit 14 and the first thermister 15 and receiving the parameters such as the voltage, current and temperature on the second cell set 20 that are detected by the second analog front end circuit 24 and the second thermister 25. Thus the controller 30 can send a control signal to the control terminals of the first programmable fuse 11 and the second programmable fuse 21 to burn out the first and second programmable fuses 11 and 12. Alternatively, the controller 30 may send a control signal to the first and second analog front end circuits 14 and 24 to turn off the first discharging switch 12 or the first charging switch 13 and the second discharging switch 22 or the second charging switch 23 at the same time, which further stops the charging/discharging operation of the first and second cell sets 10 and 20.

The voltage balance unit 40 can be formed by disposing a bidirectional switch and a current limited resister between the first cell set 10 and second cell set 20, which include a first current limited resister 41; a first field effect transistor (FET) 42; a second current limited resister 43; and a second field effect transistor (FET) 44. The voltage balance unit 40 can also be installed between the first charging/discharging switch 12, 13 and the second charging/discharging switch 22, 23 and coupled to the controller 30, the charging switch 13, the first discharging switch 12, the second charging switch 23 and the second discharging switch 22 respectively to enable the discharging of the first cell set 10 and the second cell set 20 by the voltage balance unit 40 to reach the goal of the voltage balance.

One end of the first current limited resister 41 is coupled to the drain of the first charging switch 13 and the drain of the first discharging switch 12; the source of the first FET 42 is coupled to the other end of the first current limited resister 41, and the gate is coupled to the controller 30. The first FET 42 further comprises a body diode 421 to avoid the backward flowing of the current from the first cell set 10. One end of the second current limited resister 43 is coupled to the drain of the second charging switch 23 and the drain of the second discharging switch 22; the source of the second FET 44 is coupled to the other end of the second current limited resister 43, and the gate is coupled to the controller 30. The second FET 44 also comprises a body diode 441 to avoid the backward flowing of the current from the second cell set 20. Whereby, the first cell set 10 can form a path for discharging through the first current limited resister 41 and the body diode 421 of the first FET 42 when the first discharging switch 12, the first charging switch 13, the second discharging switch 22 and the second charging switch 23 are turned off, while the second cell set 20 can form a path for discharging through the second current limited resister 43 and the body diode 441 of the second FET 44, so that the voltage of the first cell set 10 and the second cell set 20 can reach balance state.

When the first cell set 10 and the second cell set are assembled into a complete pack, it should be placed for a specific period of time (for example but not limited to a couple of hours to more than ten hours, depend on the difference of the voltage of the battery, the values of the current limited resisters 41,43 of the voltage balance unit 40 and the capacity of the cell sets 10,20), the voltage balance unit 40 can automatically balance the voltage of the first cell set 10 and the second cell set 20, and the following are the three conditions of the voltage balancing:

If the difference of the voltage of the first cell set 10 and the second cell set 20 is too huge(for example but not limited to more than 20 mv), the first and second charging switches 13,23 will be turned off, and the first and second discharging switches 12,22 will be turned on, so are the first and second FET 42,44 in the voltage balance unit 40, so that the first cell set 10 and the second cell set 20 will charge and discharge each other and consequently reach the balance state. If the difference of the voltage of the first cell set 10 and the second cell set 20 is small(for example but not limited to less than 20 mv), the first and second charging switch 13,23, the first and second discharging switch 12, 22 and the first and second FET 42,43 will be turned on, so that the voltage of the first cell set 10 and the second cell set 20 will reach balance in a short time. Because the difference of the voltage is small, the current of the bidirectional charging and discharging of the cell sets 10, 20 can be controlled, the cell sets 10, 20 and the switches 12,22, 13,23 can also be protected.

If the voltage of one of the cell of the first cell set 10 is too high, the second FET 44 in the voltage balance unit 40 will be turned off in order to limit the charging of the second cell set 20 to the first cell set 10, which can be discharged only. Through the application of the same rule, when the voltage of one of the cell of the second cell set 20 is too high, the first FET 42 in the voltage balance unit 40 will be turned off in order to limit the charging of the first cell set 10 to the second cell set 20, which can only be discharged. Such condition is to prevent the voltage of one of the cell being too high, if the cell set is kept charging when its voltage is relatively low, a safety event may be caused.

To solve the three problems mentioned above, the present invention provides a method for balancing the voltage of a hybrid battery module, please refer to FIG.2, which schematically shows a flow chart illustrating a method for balancing the voltage of a hybrid battery module according to a preferred embodiment of the present invention; as shown in the figure, the method for balancing the voltage of a hybrid battery module of this invention includes the following steps: the first and second discharging switches 12,22 will be turned on and the first and second charging switches 13,23 will be turned off when the cell sets are assembled completely (STEP 1); determining whether the voltage of one of the cell in the first cell set 10 is too high, if it is, turning off the second FET 44 (STEP 2); determining whether the voltage of one of the cell in the second cell set 20 is too high, if it is, turning off the first FET 42 (STEP 3); determining whether the difference of the voltage between the first cell set 10 and the second cell set 20 exceeds 20 mv, if it does, backing to the STEP 2 to continue discharging; otherwise, turning on the first and second charging switches 13,23(STEP 4).

In addition, the hybrid battery module with voltage balancing unit of the present invention further comprises a memory 35, which includes but not limited to an electrically erasable programmable read only memory (EEPROM). The memory 35 is coupled to the controller 30 and is used to store the voltage and current values detected by the first and second front end circuits 14 and 24 and the temperature value detected by the first and second thermisters 15 and 25, and the stored values are further referenced by the controller 30.

Moreover, the hybrid battery module with a voltage balancing unit of the present invention further comprises a first safety protection circuit 50 and a second safety protection circuit 55 that are respectively coupled to the control terminals of the first and second programmable fuses 11 and 21. When the voltage in the first cell set 10 or the second cell set 20 is higher than a predetermined value, the control terminals are controlled by a voltage comparator (not shown in the figure) disposed inside the first and second safety protection circuits 50 and 55 to burn out the first programmable fuse and/or the second programmable fuse 11 and 21 in order to protect the first cell set 10 and/or the second cell set 20.

Furthermore, the hybrid battery module with a voltage balancing unit of the present invention further includes a precharging circuit 60. Wherein its gate is coupled to the controller 30, its drain is coupled to the drain of the first FET 42 and the second FET 44, respectively, and its source is coupled to the source of the first charging switch 13 and an output terminal (BATT+) of the battery module; for providing a small current to the first and second cell sets 10 and 20 through the body diode 421, 442 of the first FET 42 and the second FET 44, respectively for precharging. Wherein, the precharging circuit 60 is a field effect transistors (FETs).

Therefore, with the hybrid battery module with a voltage balancing unit mentioned above, the first cell set 10 and the second cell set 20 of the present invention can be discharged through the voltage balancing unit 40 in advance, then charges/discharges the cell sets in parallel after the voltage is balanced, so as to make the first cell set 10 and the second cell set 20 provide a higher load capacity and a shorter charging time. Accordingly, the present invention indeed overcomes the drawbacks of the conventional hybrid battery module.

In addition, the present invention also provides a method for charging the hybrid battery module with a voltage balancing unit. Please refer to FIG. 3 for a flow chart illustrating a method for charging the hybrid battery module with a voltage balancing unit according to a preferred embodiment of the present invention. In the method for charging the hybrid battery module with a voltage balancing unit of the present invention, the battery module comprises a first cell set 10 and a second cell set 20, a first charging switch 13 and a second charging switch 23, and a first fuse 11 and a second fuse 21, and the charging method comprises the following steps: switching the first cell set 10 and the second cell set 20 into a charging state (step S1); respectively turning on the first charging switch 13 and the second charging switch 23 and charging the first cell set 10 and the second cell set 20 (step S2); determining whether the voltage in the first cell set 10 or the second cell set 20 is too high, and if it is, turning off the first charging switch 13 and the second charging switch 23 simultaneously (step S3); determining whether the charging current in the first cell set 10 or the second cell set 20 is too high, and if it is, turning off the first charging switch 13 and the second charging switch 23 simultaneously (step S4); determining whether the charging temperature in the first cell set 10 or the second cell set 20 is too high, and if it is, turning off the first charging switch 13 and the second charging switch 23 simultaneously (step S5); determining whether the voltage in the first cell set 10 or the second cell set 20 is balanced or not; and if it is not balanced, burning out the first fuse 11 and the second fuse 21 simultaneously (step S6); determining whether the first charging switch 13 or the second charging switch 23 fails to function, and if it does, burning out the first fuse 11 and the second fuse 21 simultaneously (step S7); determining whether the voltage in the first cell set 10 or the second cell set 20 exceeds a threshold voltage, and if it does, burning out the first fuse 11 and the second fuse 21 simultaneously (step S8); determining whether the first cell set 10 and the second cell set 20 are fully charged, and if they are not fully charged, continuously charging the first cell set 10 and the second cell set 20 (step S9); and respectively turning off the first charging switch 13 and the second charging switch 23 (step S10).

In step S2, the first and second charging switches 13 and 23 are turned on respectively to charge the first and second cell sets 10 and 20. Wherein, the first and second charging switches 13 and 23 are field effect transistors (FETs).

In step S3, it is determined whether the voltage in the first cell set 10 or the second cell set 20 is too high, and if it is, the first and second charging switches 13 and 23 are turned off at the same time. Here, the high voltage is 4.3V, that is when the voltage in the first cell set 10 or the second cell set 20 is higher than 4.3V, both of the first and second charging switches 13 and 23 are turned off to prevent the structure of the first cell set 10 or the second cell set 20 from being damaged.

In step S4, it is determined whether the charging current in the first cell set 10 or the second cell set 20 is too high, and if it is, the first and second charging switches 13 and 23 are turned off at the same time, such that the first cell set 10 or the second cell set 20 is not burned out.

In step S5, it is determined whether the charging temperature in the first cell set 10 or the second cell set 20 is too high, and if it is, the first and second charging switches 13 and 23 are turned off at the same time, such that the first cell set 10 or the second cell set 20 is not burned out.

In step S6, it is determined whether the voltage in the first cell set 10 or the second cell set 20 is not balanced, and if it is not balanced, the first and second fuses 11 and 21 are burned out at the same time to prevent the current generated by the unbalanced voltage from flowing into the cells that have a lower voltage, which will otherwise burn out the cell set.

In step S7, it is determined whether the first charging switch 13 or the second charging switch 23 fails to function, and if it does, the first and second fuses 11 and 21 are burned out at the same time. The states of the first and second charging switches 13 and 23 are respectively recorded by a bit in the memory 35. For example, the bit is 1 in ON state and 0 in OFF state. Therefore, in a case where both of the first and second charging switches 13 and 23 are turned off and the state value read by the controller is 0, some currents are still detected by the controller on the wire, which indicates the first and second charging switches 13 and 23 fail to function. In such case, the first and second fuse 11 and 21 are burned out at the same time to prevent the first cell set 10 or the second cell set 20 from being burned out.

In step S8, it is determined whether the voltage in the first cell set 10 or the second cell set 20 exceeds the threshold voltage, if it does, the first and second fuses 11 and 21 are burned out at the same time, here the threshold voltage is 4.4V.

Furthermore, the present invention also provides a method for discharging the hybrid battery module. Please refer to FIG. 4 for a flow chart illustrating a method for discharging the hybrid battery module with a voltage balancing unit according to a preferred embodiment of the present invention.

In the method for discharging the hybrid battery module with a voltage balancing unit of the present invention, the battery module comprises a first cell set 10 and a second cell set 20, a first discharging switch 12 and a second discharging switch 22, and a first fuse 11 and a second fuse 21, and the discharging method comprises the following steps: switching the first cell set 10 and the second cell set 20 into a discharging state (step S1); respectively turning on the first discharging switch 12 and the second discharging switch 22 and discharging the first cell set 10 and the second cell set 20 (step S2); determining whether the voltage in the first cell set 10 or the second cell set 20 is too low, and if it is, turning off the first discharging switch 12 and the second discharging switch 22 simultaneously (step S3); determining whether the discharging current in the first cell set 10 or the second cell set 20 is too high, and if it is, turning off the first discharging switch 12 and the second discharging switch 22 simultaneously (step S4); determining whether the discharging temperature in the first cell set 10 or the second cell set 20 is too high, and if it is, turning off the first discharging switch 12 and the second discharging switch 22 simultaneously (step S5); and determining whether the first discharging switch 12 or the second discharging switch 22 fails to function, and if it does, burning out the first fuse 11 and the second fuse 21 simultaneously (step S6).

In step S2, the first and second discharging switch 12 and 22 are turned on respectively to discharge the first and second cell sets 10 and 20. Wherein, the first and second discharging switch 12 and 22 are field effect transistors (FETs).

In step S3, it is determined whether the voltage in the first cell set 10 or the second cell set 20 is too low, and if it is, the first and second discharging switch 12 and 22 are turned off at the same time. Here, the low voltage is 2.5V, that is when the voltage in the first cell set 10 or the second cell set 20 is lower than 2.5V, both of the first and second discharging switch 12 and 22 are turned off.

In step S4, it is determined whether the discharging current in the first cell set 10 or the second cell set 20 is too high, and if it is, the first and second discharging switch 12 and 22 are turned off at the same time to prevent the first cell set 10 or the second cell set 20 from being burned out.

In step S5, it is determined whether the discharging temperature in the first cell set 10 or the second cell set 20 is too high, and if it is, the first and second discharging switch 12 and 22 are turned off at the same time, so as to prevent the first cell set 10 or the second cell set 20 from being burned out.

In step S6, it is determined whether the first discharging switch 12 or the second discharging switch 22 fails to function, and if it does, the first and second fuses 11 and 21 are burned out at the same time to prevent the cell sets from being burned out. The states of the first and second charging switches 13 and 23 are respectively recorded by a bit in the memory 35. For example, the bit is 1 in ON state and 0 in OFF state. Therefore, in a case where both of the first and second charging switches 13 and 23 are turned off and the state value read by the controller is 0, meanwhile some currents are still detected by the controller on the wire, which indicates the first and second charging switches 13 and 23 fail to function. In such case, the first and second fuse 11 and 21 are burned out at the same time to prevent the first cell set 10 or the second cell set 20 from being burned out. Furthermore, the first and second fuses 11 and 21 are programmable fuses.

Accordingly, the implementation of the present invention has the following advantages:

1. More than two cell sets are used in the present invention, and different types of cell sets can be selected for adapting to various sizes of the electronic apparatus, such that more design flexibility is provided by the present invention.

2. The charging/discharging operations are performed through the control of the charging/discharging controlling method in parallel, such that a higher load capacity and a shorter charging time are provided.

3. The charging/discharging operations are performed through the control of the charging/discharging controlling method in parallel, such that the voltages (potentials) of different types of cell sets can reach a balanced state, so as to substantially employ the stored energy.

4. The hybrid battery module comprises a voltage balancing unit, which can automatically balance the voltages between the cell sets.

In addition, in the battery module of the present invention and its manufacturing, charging and discharging method, regardless the battery module is in the charging or discharging mode, as long as one cell set had encountered an abnormal or threshold safety condition, the charging switches, discharging switches or fuses are turned off at the same time to prevent the cell sets from being damaged. Accordingly, the present invention definitely overcomes the drawbacks of the conventional battery module and its charging and discharging method.

In summation of the description above, the object, technical characteristics and performance of the present invention are novel and improve over the prior art and thus is duly submitted for the patent application.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A hybrid battery module with a voltage balancing unit, comprising:

a first cell set;

a first programmable fuse, with a first end coupled to said first cell set;

a first discharging switch, with a source coupled to a second end of said first programmable fuse;

a first charging switch, with a drain coupled to a drain of said first discharging switch;

a first analog front end circuit, being respectively coupled to a gate of said first discharging switch and a gate of said first charging switch, for detecting a voltage or a current of said first cell set in order to control ON and OFF of said first discharging switch and said first charging switch;

a first thermister, with an end coupled to a ground, for detecting a temperature of said first cell set;

a second cell set;

a second programmable fuse, with a first end coupled to said second cell set;

a second discharging switch, with a source coupled to a second end of said second programmable fuse;

a second charging switch, with a drain coupled to a drain of said second discharging switch;

a second analog front end circuit, respectively coupled to a gate of said second discharging switch and a gate of said second charging switch, for detecting a voltage or a current of said second cell set in order to control ON and OFF of said second discharging switch and said second charging switch;

a second thermister, with an end coupled to a ground, for detecting a temperature of said second cell set;
a controller, being respectively coupled to another end of said first thermister, a control terminal of said first programmable fuse, another end of said second thermister, and a control terminal of said second programmable fuse; and
a voltage balancing unit, being respectively coupled to said controller, said first charging switch, said first discharging switch, said second charging switch and said second discharging switch;
such that said first cell set and said second cell set can be discharged by said voltage balancing unit, so as to reach a goal of voltage balance.

2. The hybrid battery module with a voltage balancing unit of claim 1, wherein said first discharging switch, said first charging switch, said second discharging switch and said second charging switch are field effect transistors (FETs).

3. The hybrid battery module with a voltage balancing unit of claim 1, wherein said first analog front end circuit and said second analog front end circuit are integrated circuits (ICs).

4. The hybrid battery module with a voltage balancing unit of claim 1, further comprising a memory coupled to said controller for storing a voltage value and a current value detected by said first analog front end circuit and said second analog front end circuit and a temperature value detected by said first thermister and said second thermister.

5. The hybrid battery module with a voltage balancing unit of claim 4, wherein said memory is an electrically erasable programmable read only memory (EEPROM).

6. The hybrid battery module with voltage balancing unit of claim 1, further comprising a first safety protection circuit and a second safety protection circuit, being respectively coupled to a control terminal of said first programmable fuse and a control terminal of said second programmable fuse, wherein a voltage comparator is disposed inside said first safety protection circuit and said second safety protection circuit, when said voltage in said first cell set or said second cell set is higher than a predetermined value, said voltage comparator controls said control terminals to burn out said first programmable fuse and/or said second programmable fuse for protecting said first cell set and/or said second cell set.

7. The hybrid battery module with voltage balancing unit of claim 1, wherein said voltage balancing unit further comprising:
a first current limited resister, one end being coupled to the drain of said first charging switch and the drain of said first discharging switch;
a first field effect transistor, the source being coupled to another end of said first current limited resister, and the gate being coupled to said controller, wherein said first field effect transistor further comprises a body diode;
a second current limited resister, one end being coupled to the drain of said second charging switch and the drain of said second discharging switch; and
a second field effect transistor, the source being coupled to another end of said second current limited resister, and the gate being coupled to said controller, wherein said second field effect transistor further comprises a body diode;
whereby, said first cell set can form a path for discharging through said first current limited resister and said body diode of said first field effect transistor when said first discharging switch, said first charging switch, said second discharging switch and said second charging switch are turned off; while said second cell set can form a path for discharging through said second current limited resister and said body diode of said second field effect transistor, so that the voltage of said first cell set and said second cell set can reach balance state.

8. The hybrid battery module with a voltage balancing unit of claim 7, further comprising a precharging circuit, wherein its gate is coupled to said controller, its drain is coupled to said drain of said first field effect transistor and said second field effect transistor, respectively, and its source is coupled to said source of said first charging switch and an output terminal of said battery module; for providing a small current to said first and second cell sets and through said body diode of said first field effect transistor and said second field effect transistor respectively for precharging.

9. The hybrid battery module with voltage balancing unit of claim 8, wherein said precharging circuit is a field effect transistor (FET).

10. A method for charging a hybrid battery module with a voltage balancing unit, wherein said battery module comprises a first cell set and a second cell set, a first charging switch and a second charging switch, and a first fuse and a second fuse, and said charging method comprising:
switching said first cell set and said second cell set into a charging state;
respectively turning on said first charging switch and said second charging switch and charging said first cell set and said second cell set;
determining whether a voltage in said first cell set or said second cell set is too high, and if it is, turning off said first charging switch and said second charging switch simultaneously;
determining whether a charging current in said first cell set or said second cell set is too high, and if it is, turning off said first charging switch and said second charging switch simultaneously;
determining whether a charging temperature in said first cell set or said second cell set is too high, and if it is, turning off said first charging switch and said second charging switch simultaneously;
determining whether said voltage in said first cell set or said second cell set is balanced or not; and if it is not balanced, burning out said first fuse and said second fuse simultaneously;
determining whether said first charging switch or said second charging switch fails to function, and if it does, burning out said first fuse and said second fuse simultaneously;
determining whether said voltage in said first cell set or said second cell set exceeds a threshold voltage, and if it does, burning out said first fuse and said second fuse simultaneously;
determining whether said first cell set and said second cell set are fully charged, and if they are not fully charged, continuously charging said first cell set and said second cell set; and
respectively turning off said first charging switch and said second charging switch.

11. The method for charging the hybrid battery module with a voltage balancing unit of claim 10, wherein said first charging switch and said second charging switch are field effect transistors (FETs), and said first fuse and said second fuse are programmable fuses.

12. The method for charging the hybrid battery module with a voltage balancing unit of claim 10, wherein in said step of determining whether a voltage in said first cell set or said second cell set is too high, said high voltage is 4.3V.

13. The method for charging the hybrid battery module with a voltage balancing unit of claim 10, wherein in said step of determining whether said voltage in said first cell set or said second cell set exceeds a threshold voltage, said threshold voltage is 4.4V.

14. A method for discharging a hybrid battery module with a voltage balancing unit, wherein the battery module comprises a first cell set and a second cell set, a first discharging switch and a second discharging switch, and a first fuse and a second fuse, and said discharging method comprises:

switching said first cell set and said second cell set into a discharging state;

respectively turning on said first discharging switch and said second discharging switch and discharging said first cell set and said second cell set;

determining whether a voltage in said first cell set or said second cell set is too low, and if it is, turning off said first discharging switch and said second discharging switch simultaneously;

determining whether a discharging current in said first cell set or said second cell set is too high, and if it is, turning off said first discharging switch and said second discharging switch simultaneously;

determining a discharging temperature in said first cell set or said second cell set is too high, and if it is, turning off said first discharging switch and said second discharging switch simultaneously; and determining whether said first discharging switch or said second discharging switch fails to function, and if it does, burning out said first fuse and said second fuse simultaneously.

15. The method for discharging the hybrid battery module with a voltage balancing unit of claim 14, wherein said first discharging switch and said second discharging switch are field effect transistors (FETs), and said first fuse and said second fuse are programmable fuses.

16. The method for discharging the hybrid battery module with a voltage balancing unit of claim 14, wherein in said step of determining whether a voltage in said first cell set or said second cell set is too low, said low voltage is 2.5V.

17. A method for balancing the voltage of a hybrid battery module, wherein the battery module comprises a first cell set and a second cell set, a first charging switch and a second charging switch, and a first discharging switch and a second discharging switch, and said method comprises:

(1) said first and second discharging switches being turned on and said first and second charging switches being turned off when the cell sets are assembled completely;

(2) determining whether the voltage of one of the cell in said first cell set is too high, if it is, turning off a second field effect transistor;

(3) determining whether the voltage of one of the cell in said second cell set is too high, if it is, turning off a first field effect transistor;

(4) determining whether the discharging current of said first cell set or said second cell set is too high, if it is, turning off said first discharging switch and said second discharging switch simultaneously; and (5) determining whether the difference of the voltage between said first cell set and said second cell set exceeds a specific voltage, if it does, backing to the STEP (2) to continue discharging; otherwise, turning on said first and second charging switches.

18. The method for balancing the voltage of a hybrid battery module of claim 17, wherein said first charging switch, said second charging switch, said first discharging switch and said second discharging switch are field effect transistors (FETs).

19. The method for balancing the voltage of a hybrid battery module of claim 17, wherein said specific voltage is 20 mV in STEP (2).

20. The method for balancing the voltage of a hybrid battery module of claim 17, wherein said first field effect transistor and said second field effect transistor further comprises a body diode respectively.

* * * * *